April 17, 1962
A. J. ROUBAL
3,030,098
RESILIENT MOUNT ASSEMBLY
Filed Aug. 24, 1959
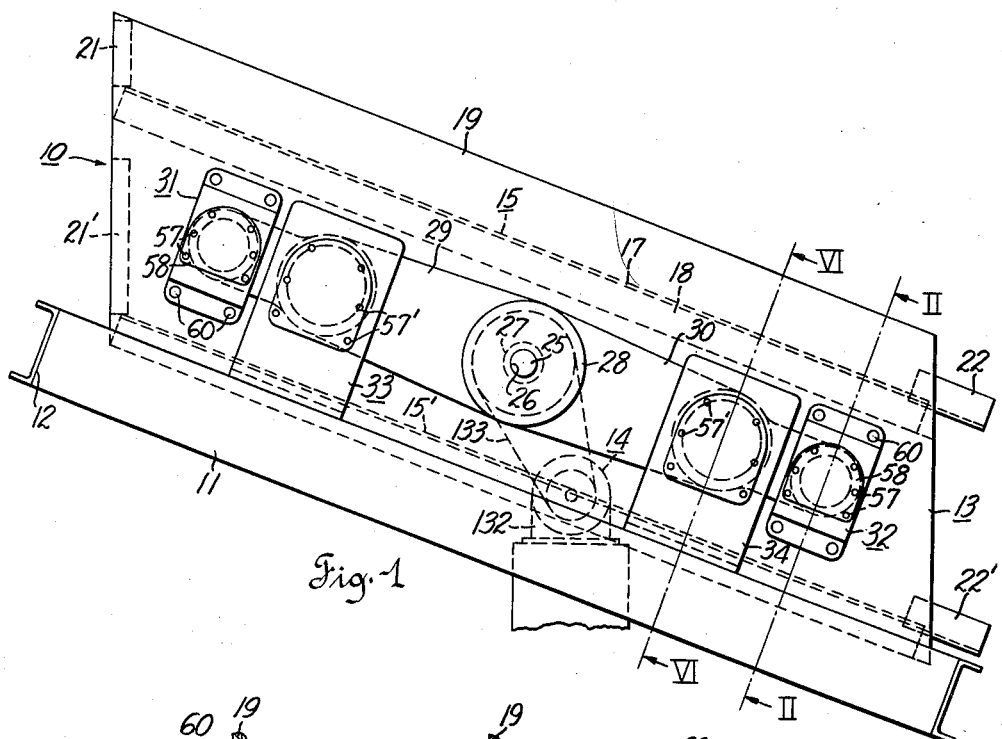
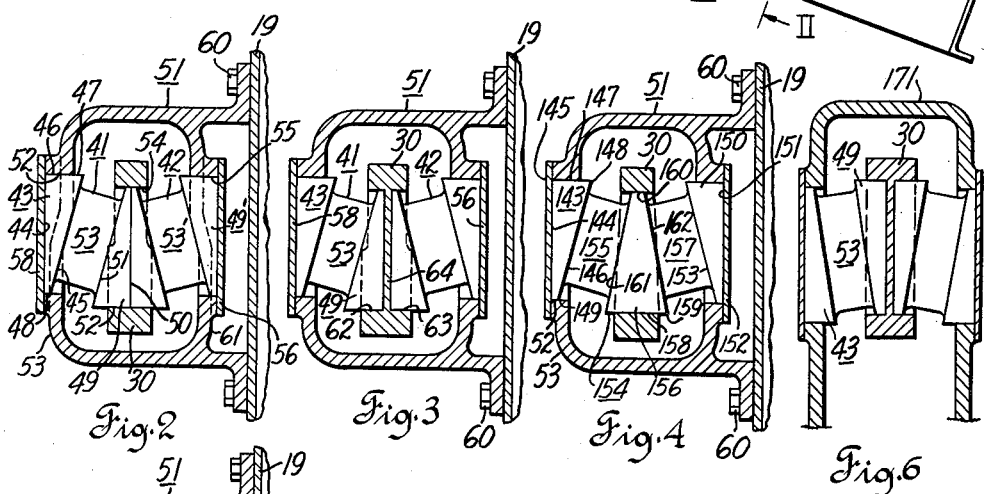
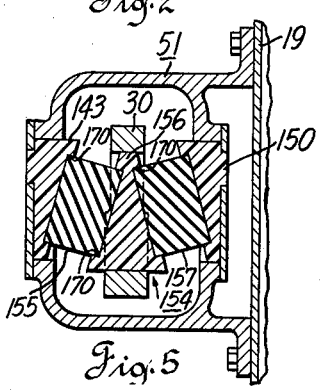
Inventor
Alexander J. Roubal
by Richard R. Mybeck
Attorney

United States Patent Office 3,030,098
Patented Apr. 17, 1962

3,030,098
RESILIENT MOUNT ASSEMBLY
Alexander J. Roubal, Milwaukee, Wis., assignor to Allis-Chalmers Manufacturing Company, Milwaukee, Wis.
Filed Aug. 24, 1959, Ser. No. 835,744
3 Claims. (Cl. 267—1)

This invention relates generally to the manufacture of resilient mounts and more particularly to resilient shear mounts of the type especially adaptable for use with vibratable machines in which the movable body may be either supported or stabilized or both by the strategic placement of shear mounts relative to the body and its supporting structure.

For purposes of establishing a setting for the further description of the present invention, my mounts will be described in association with a vibrating screen of the type disclosed in my copending application Serial No. 818,575, filed June 8, 1959. It is, of course, understood and will become apparent that my mounts may be readily employed in a number of varied applications.

Resilient shear mounts known heretofore and disclosed, for instance, in Parks, U.S. 2,212,550, have been characterized by a linear design in which the outside with the resilient working portion, that is, the mounting surfaces lie perpendicular to the axis of the resilient working portion. When such mounts are used, and they are normally installed in pairs, they must be bolted into a complex mounting bracket (which, in turn, is bolted to the machine) in such a manner that the axes of the respective working portions are inclined in opposite directions to achieve the desired resistance to shear forces. Thus, since the mounts themselves are linear, the mounting brackets must have the required inclination built into them. This results in an intricate angular mount assembly which requires extensive machining and the fabrication of which, including the forming and machining of the several angles required, is extremely arduous and costly.

Some efforts to reduce the cost of machining these mounting brackets resulted in the practice of setting the mounts directly on as-cast surfaces. This practice is undesirable, however, because the natural roughness of such as-cast surfaces causes the mounts to become badly misaligned thereby significantly reducing the important shear resistant properties.

The present invention is predicated upon my discovery of an improved design for resilient shear mounts in which two spaced rigid wedgelike end portions are disposed in spaced relationship to each other in such a manner that the base surfaces of each wedge portion face outwardly and are parallel to each other while the inclined faces of the wedges are convergent with their adjoining base surfaces; and a resilient linking portion is joined with and extends between the inclined surfaces in oblique relationship to the outer surface of each of the end portions. My design thus provides a novel mount structure which, as shall hereinafter be described in greater detail, is easily, economically and accurately produced and possesses a remarkably unexpected propensity for resisting shear forces.

Accordingly, the prime objects of the present invention are to provide an improved resilient mount assembly which alleviates substantially all of the disadvantages attending the prior art assemblies, costs less to produce, is easily aligned and maintains its alignment throughout its operation, and combines the high vibration dampening properties of rubber loaded in shear, with the safety, durability and ease of installation of a simple compression mount.

These, and still further objects as shall hereinafter appear, are fulfilled by the present invention in a most advantageous manner as may be easily discerned from the following detailed description of shear mounts embodying the present invention, especially when the description is read in conjunction with the accompanying drawing.

In the drawing, in which like parts bear like numerals throughout the several views:

FIG. 1 is a side elevation of a vibrating device of the type which may employ the present invention;

FIG. 2 is a cross sectional view, taken along lines II—II of FIG. 1, of a mount assembly embodying the present invention and employed to stabilize the vibrating device of FIG. 1;

FIG. 3 is a cross sectional view, in the plane of FIG. 2, of an alternative mount assembly embodying the present invention;

FIG. 4 is a cross sectional view, in the plane of FIG. 2, of another mount assembly embodying the present invention;

FIG. 5 is a cross sectional view, in the plane of FIG. 2, of still another mount assembly embodying the present invention; and FIG. 6 is a cross sectional view, taken along lines VI—VI of FIG. 1, of a mount assembly embodying the present invention and employed to support the vibrating device of FIG. 1.

By way of example, my improved shear mounts will be shown and described in connection with a screening device indicated in FIG. 1 by the general reference numeral 10.

As shown, screening device 10 comprises a base structure 11 which may be formed of a plurality of channel rails or like numbers 12, carried by appropriate supports (not shown).

A suitable screen body 13 may be freely or resiliently mounted with the base 11 and inclined in the conventional manner to permit the flow of material therethrough in response to agitation provided by a suitable gyrating mechanism 14. The body 13 is provided with screen decks 15, 15' mounted in the usual spaced relationship to each other. Each deck 15 comprises a suitable screen cloth 17 and clamping means 18, for drawing and holding the cloth relative to screen body 13. It is, of course, understood that any desired number or type of screen decks may be employed according to the exigencies of the operations.

Other screen features such as: upwardly extending side plates 19, which reach above the screen decks to prevent the latreal loss of material therefrom; end plates 21, 21' which prevent spillage of material at the feed end of the screen; chutes 22, 22' which direct the flow of the material from the decks into other receptacles, etc., are well known and as such need not be further described here, it being sufficient to indicate that screening device 10 or, adjacent the discharge end of the screen, any like vibratable device possesses operational characteristics which are enhanced by my present invention.

I shall, therefore, refer henceforth to only those portions of the screening device 10 whose description lends to a more complete understanding of the structure, function, and operational characteristics of my unique resilient shear mount.

The gyrating mechanism 14 of the screen shown comprises a shaft 25 which is provided at each end with a journal portion 26 which extends into a bearing (not shown) which is fitted in the adjoining side walls 19.

In the four bearing screen described in my aforementioned copending application, each journal portion 26 extends beyond its adjoining side wall 19 into second bearings 27 which are disposed outboard of sidewalls 19. Thus, bearing 27, and its unseen counterpart on the other side of the screen, lie outboard of the adjacent side walls 19 and will be, therefore, called "outer bearings."

Each outer bearing 27 is enclosed in a suitable outer bearing housing 28, herein called "housing" which, in turn, is provided with a pair of outwardly extending arm portions or extensions 29, 30.

To gyrate the screening device 10, a suitable power supply, such as motor 132, is drivingly connected to shaft 25 with a suitable linkage such, for example, as V-belts 133.

Gyration of the screen body 13 is thus readily achieved by the actuation of the motor 132 which, in turn, drives linkage 133 whereupon gyrating shaft 25 is rotated in its bearings, to impart gyratory movement to decks 15, 15'.

In the specific application illustrated, my new mounts are employed relative to housing 28, as I shall now describe. Thus, as previously described, housing 28 is provided with outreaching arms or extensions 29, 30. Arms 29, 30 extend from opposed peripheral portions of housing 28 generally longitudinally of screen body 13. Arms 29, 30 terminate short of the ends of body 13 as shown in FIG. 1. Of course, a like construction is provided on the opposite side of the screen body 13.

Adjacent the ends of each arm, for example, arm 29, and intermediate the arm and the screen frame 13, I interpose a shear mount assembly 31 of the present invention to resiliently connect the arm to the screen frame 13. A like mount assembly 32 is provided intermediate arm 30 and frame 13 adjacent the end of arm 30.

Another pair of shear mount assemblies 33, 34 are deployed adjacent mount assemblies 31, 32, respectively, between arm portions 29, 30 and the adjacent portion of supporting structure 11.

When installed in the fashion thus described, my mount assemblies serve two of the very useful functions for which they may be potentially employed. Specifically, mount assemblies 31, 32 perform a function which the vibrating art calls "stabilizing" whereas assemblies 33, 34 perform the function known as "supporting." The essential concept and basic operational characteristics of my assemblies are, however, the same irrespective of the particular application or function in which they are employed. It should be noted, however, that the desired application or function will be reflected in the specific installed orientation of the mount as will be hereinafter more fully explained.

Referring now to FIG. 2, the embodiment of the mount shown therein comprises first and second modular units 41, 42, respectively. Since both units are identical, unit 41 will be described as typical.

Unit 41 comprises a first wedge shaped end portion 43 having a first planar surface 44 (herein called "base surface") lying in a generally vertical plane (relative to the drawing) and a second planar surface 45 (herein called "inclined surface") inclined with and convergent upon base surface 44. While end portions 43 may be made to have a rectangular end section, it is generally preferable that its end section be circular as shown in phantom in FIG. 1.

While base surface 44 and inclined surface 45 are disposed generally convergent relative to each other, they preferably remain in spaced relationship to each other and are joined by a peripheral edge 46 which envelopes the portion. Peripheral edge 46 may be looked upon as containing two halves, each of which, in the nature of a wedge, uniformly decrease in width (relative to the drawing) from an element of maximum width as at 47, to an element of minimum width, as at 48.

Unit 41 further comprises a second wedge shaped end portion 49, which, like end portion 43, has a base surface 50 and inclined surface 51 and a peripheral edge 52 disposed in a fashion relative to each other identical to the interrelationship between surfaces 44, 45, and edge 46.

It will be readily noted, however, from a visual inspection of the drawing that end portion 49 provides an inverse mirror image of end portion 43. That is to say, base surfaces 44, 50 lie in "outer" planes which are parallel to each other, and inclined surfaces 45, 51 lie in "inner" planes which are parallel to each other but convergent to the planes of surfaces 44, 50, while the direction of diminishing width of edges 46, 52 is inverted.

Unit 41 further comprises a resilient linking portion 53 secured by and extending between end portions 43, 49 in intimate relationship to inclined surfaces 45, 51 and angularly disposed relative to base surfaces 44, 50. In its preferred form, linking portion 53 will be disposed generally normal to surfaces 45, 51 whereupon the working section of the portion 53, i.e., a section taken normal to its longitudinal axis, is deliberately out of parallel with surfaces 44, 50.

In the embodiment of FIG. 2, an acceptable fashion of mounting units 41, 42 in assembly 31 to stabilize the vibrating device 10 is shown. In stabilizing it should be remembered that the shear forces being resisted arise from (1) a loading action placed upon the mount assembly by the screen body 13 acting through a suitable mounting bracket 51, secured thereto as with bolts 60; and (2) a reaction (per Newton's law) by the outer bearing housing arm, e.g., arm 30.

Thus, to achieve the mounting illustrated in FIG. 2, when bracket 51 is already secured to side plate 19, unit 42 is first introduced through opening 52 defined in the outboard side 53 of bracket 51, passed almost completely through an opening 54 defined in arm 30 whereupon its second end portion 49' (corresponding to portion 49 of unit 41, previously described) is seated in the mounting chamber provided by the coaction of opening 55, defined in the inboard side 61 of bracket 51, and end plate 56 which is detachably secured to bracket 51 in any suitable fashion such as with a series of strong bolts 57 or the like. Next unit 41 is introduced through opening 52 and extended into opening 54 until it abuts unit 42. Then a second end plate 58, similar to plate 56, is likewise detachably secured to bracket 51. Of special note, however, is that the axes of inclination of linking portions 53, 53' of units 41, 42, respectively, converge upon each other away from the bracket load, i.e., either the actual load applied to the bracket or the reaction (reactive load) resulting in the bracket from an actual load applied elsewhere, e.g., to arm 30. Thus, since we are discussing a stabilizing application of my mount in which bracket 51 will have the actual load effectively acting from its top (relative to the drawing), the apex of the angle theoretically included between the axes of linking portions 53, 53' (i.e., defined by the projections of the respective longitudinal axes of these portions) will be in the direction of the actual load which is opposed to the direction of the reaction of arm 30 to the load. Consequently, the apex will point downwardly (relative to the drawing).

A significant characteristic of the present invention thus becomes clear since by strategic inclination of linking portions of the modular units during assembly, the shear load is converted to and resisted by a compression reaction in the mounts. For example, when a load is placed on the mounts as by the movement of the body by gyrating means 14, the displacement (i.e., relative vertical movement, in the drawing) between mount end portions 43, 49 resulting from the load, creates a compression force in the mounts and "squeezes" the assembly in the space between the opposite end plates 56, 58 of the bracket 51. The greater the load, the more the displacement and the greater the compression force. This compression force acting between the mount and the bracket end plates increases the allowable unit shear stress at this point thereby increasing the safety of the unit. Thus, the angular relationship of the central linking portion 53 to the mounting or base surfaces 44, 50 of end portions 43, 49 is especially significant also from a safety standpoint.

To put it another way, the relative downward displacement of the end portions 43 and 49′, results in a compression of the central linking portions 53, 53′, respectively, and increases its load carrying ability. In addition, the compression stress does not affect the operation of the machines with which it is employed. The smoothness of machine operation is maintained because of the equal and opposite reactions being developed in the resilient units.

In FIG. 3 an alternative fashion of employing units 41, 42 is shown. The construction and functional operation of the modular mount units is identical with the embodiment of FIG. 2 and, therefore, will not be redescribed. The key difference in the assemblies lies in the preparation of arm 30 for the mount units. Thus, arm 30, instead of having hole 54 defined completely therethrough, is provided with two oppositely facing mount seats 62, 63 substantially in register with each other so that mounts 41, 42 instead of abutting each other as before, abut a partion member 64 of arm 30 disposed intermediate seats 62, 63. In this particular embodiment, the mounts function exactly as before, although the compression forces within each unit now act between partition 64 and side walls 56, 58 of the bracket 51. The cumulative effect is the same.

Another embodiment of the present invention is shown in FIG. 4. It, too, is employed in a stabilizing function in connection with outer bearing housing arm 30 and bracket 51 which, as before, is suitably secured to body 13 as with bolts 60.

As shown in FIG. 4, this embodiment comprises a first wedge shaped end portion 143 having a first planar or base surface 144 in intimate abutting relationship with detachable end plate 145 and a second planar or inclined surface 146 disposed in spaced convergent relationship with base surface 144. As before, a peripheral edge 147 extends between and joins base surface 144 and inclined surface 146 and uniformly decreases in dimension from a preselected maximum dimension, as at 148, to a preselected minimum dimension, as at 149. Edge 147 is carried by bracket 51 and rests upon the inner surface of opening 52 defined therein on the outboard side 53 thereof.

A second wedge shaped end portion 150, having a base or mounting surface 151 in intimate abutting relationship with end plate 152 and an inclined surface 153 spaced from and convergent upon said base surface 151, is disposed in spaced mirror image relationship to said first end portion 143 so that the respective mounting surfaces 144, 151 are substantially parallel with each other.

A resilient central or linking portion 154 is secured by and extends between end portions 143, 150, and is angularly disposed relative thereto.

Central portion 154 further comprises what will be considered a first or left hand (relative to the drawing) section 155, a second or middle section 156, and a third or right hand (relative to the drawing) section 157.

In the preferred formation of this embodiment, sections 155, 157 are formed substantially identically to the resilient central linking portion 53 of modular units 41, 42 while section 156 is analogous to two wedge shaped end portions of the type described formed into an integral member by adhering their respective base surfaces together.

Thus, in the elevation of FIG. 4, section 156 possesses the cross section of a truncated isosceles triangles. In this fashion, middle section 156 has a peripheral edge 158 which may be considered to consist of two halves, each of which varies uniformly in dimension from a preselected maximum, as at 159, to a preselected minimum, as at 160. Middle section 156 further comprises first and second planar faces 161, 162, respectively, lying in spaced converging relationship to each other transversely of edge 158. End sections 155, 157, respectively, are joined to and extend from one of the planar faces 161, 162, into engaging relationship with the inclined surfaces 146, 153 of the adjoining end portions 143, 150. Thus, end section 155 resiliently connects face 161 and surface 146 while end section 157 resiliently connects face 162 and surface 153.

In the preferred form of this embodiment face 161 and surface 146 will lie parallel to each other and the longitudinal axis of end section 155 will be disposed generally normal thereto. Similarly, the axis of end section 157 will be disposed generally normal to the parallel planes of surface 153 and face 162. In this manner, the extended longitudinal axes of end sections 155, 157 define an included angle therebetween, the apex of which, as previously discussed, will oppose the direction of the load applied to the mount.

In the manufacture of this embodiment, end sections 155, 157 are preferably provided a cylindrical form although sections having parallelepipedon form have been found satisfactory. Again, as in the previous embodiment, the base surfaces 144, 151 of spaced wedge shaped end portions 143, 150, respectively, are parallel to each other outboard of the remainder of the assembly.

Another embodiment of the present invention which is exemplified by, but not expressly shown in, FIG. 5, comprises an assembly in which, referring to unit 41 of FIG. 2, the several portions are created as discrete parts. Thus, end portions 43, 49 may be formed as unitary structures which may be provided with seats into which unitary central linking portion 53 may be seated as will be described. A similar arrangement, of course, would make up unit 42. Thus, it can be readily seen that the elimination of bolts has been completely obtained in the use of this arrangement.

A variant of this embodiment which is specifically shown in FIG. 5 is analogous to FIG. 4 wherein end portions 143, 150, end sections 155, 157, and middle section 156 are formed as discrete members and then assembled to achieve the desired angular relationship as previously described. Seats 170 are defined in portions 143, 150 and section 156 to hold the several members in the desired relationship.

Another embodiment of the present invention is shown fulfilling a "supporting" function in FIG. 6. The modular units are the same as those of FIG. 3 except that the included angle of convergence is in an upward direction (relative to the drawing) since, in a supporting arrangement, the actual load is applied to arm 30 in a downward direction. The bracket 171 utilized for supporting differs from bracket 51 essentially only in that it is secured to supporting means 11 of the device rather than to the screen body 13 as it would be for a stabilizing installation. The remaining structure in this arrangement is substantially identical in function and relationship to those previously described, that it need not be further described here.

It should be noted that while complete brackets have been shown herein in connection with the description of my several embodiments, it is done so merely by way of illustration. Thus, as can be readily discerned by one skilled in the mechanics of movement, support is needed in the mount only to oppose the tendency of the mount portions to move, arising from either the actual or the reactive loads. Thus, for example, when loading the arm from the top, it is only necessary to have the bottom portions of the bracket. The top portions of the bracket and the bottom portion of the arm can be eliminated for economy of materials. Similarly, when the top of the bracket attached to the screen body is where the actual load is applied, and the arm is resisting the load; the lower portion of the bracket and the upper portion of the arm may be omitted from the structure.

It should be further noted that the opening defined in the respective brackets and in which the mount is seated may be either round or square from the end section depending upon the exigencies of the specific installation, and that in every instance the end section of the bracket (in the plane of the drawing) defines a generally rectangular opening. Thus, all complex mounting, casting and machining of brackets to supply angles thereto is eliminated. Thus, instead of having to machine a custom bracket for every mount made, the present invention permits use of a standard bracket and the enjoyment of the resulting economies. This invention further enables the manufacturer to obtain a vastly improved operation whereby, with but a single mold, the mounts can be cast uniformly and accurately to possess the desired angle. Still further advantages result from the enhanced accuracy and functioning provided by the uniform and generally interchangeable mounts.

In the manufacture of the mounting units employed in the assembly of this invention, it has been found especially desirable to form the several wedgelike end portions of a rubberlike material having a durometer rating of at least about 70 to 75. In heavier vibrating machinery, such as the screen herein employed to illustrate the present invention, end portions formed of a hard rubber type material having durometer readings of 85 to 87 gave excellent results.

In the manufacture of the resilient linking portions, a softer material is desired and rubberlike materials having a durometer reading of about 30 to 50 are found to give excellent results.

It is, of course, understood that these durometer readings are not intended to be absolute values, but merely an indication of the readings found satisfactory in the exemplary applications herein described. It is, of course, within the normal skill of the artisan to adjust his materials to suit his particular needs. It is, of course, well known that the higher the durometer reading of a material, the more expensive it will be, and it is not the intention of this invention to overengineer or overdesign for any particular application.

It is still further contemplated, when the exigencies of the operation of the mounted equipment permit, that the wedgelike end portions may be fabricated of metal or other suitable rigid materials which are capable of providing the deflection characteristics hereinbefore described. In the embodiments wherein the mount assembly is fabricated in modular units, it has been found that resilient linking portions formed of softer elastomeric materials, based on either natural or synthetic rubber, can be readily fused to the more rigid end portions when made of either hard rubber or metal without the fusion interface in any way detracting from the required strength.

While several embodiments and applications of the present invention have been herein described and illustrated, it is of course understood that it is done so merely to exemplify the present invention and not to limit it. Indeed, such modifications, alterations and applications as will readily occur to those confronted with this teaching are likewise intended within the spirit of this invention, especially as it is defined by the appended claims.

Accordingly, having now particularly described and ascertained the nature of my invention and the manner in which it is to be performed, I declare that what I claim is:

1. A resilient mounting assembly for supporting a structure for movement relative to another structure, comprising: a pair of oppositely movable parallel and laterally spaced supporting members; two laterally spaced wedges carried in a first of said members; a third wedge disposed between said spaced wedges and carried by a second of said members centrally of upper and lower edges thereof, said third wedge having inclined surfaces facing inclined surfaces of both said spaced wedges with the taper of said third wedge inverted with respect to said spaced wedges, said wedge being split in the direction of its taper into two wedge shaped sections that abut each other and the inclined surfaces of all said wedges forming knifelike edges that extend parallel to said parallel members; and resilient linking pads extending between and attached to the inclined facing surfaces of the three wedges.

2. A resilient mounting assembly for supporting a structure for movement relative to another structure, comprising: a pair of oppositely movable parallel and laterally spaced supporting members; two laterally spaced wedges carried in a first of said members; a third wedge disposed between said spaced wedges and carried by a second of said members centrally of upper and lower edges thereof, said third wedge having inclined surfaces facing inclined surfaces of both said spaced wedges with the taper of said third wedge inverted with respect to said spaced wedges, and the inclined surfaces of all said wedges forming knifelike edges that extend parallel to said parallel members; and resilient linking pads extending between and attached to the inclined facing surfaces of the three wedges, with the resilient pads being cylindrical in cross section, and the cylindrical axis extending in the direction of extent of the pads between the inclined surfaces of the wedges.

3. A resilient mounting assembly for supporting a structure for movement relative to another structure, comprising: a pair of oppositely movable parallel and laterally spaced supporting members; two laterally spaced wedges carried in a first of said members; a third wedge disposed between said spaced wedges and carried by a second of said members centrally of upper and lower edges thereof, said third wedge having inclined surfaces facing inclined surfaces of both said spaced wedges with the taper of said third wedge inverted with respect to said spaced wedges, and the inclined surfaces of all said wedges forming knifelike edges that extend parallel to said parallel members; and resilient linking pads extending between and attached to the inclined facing surfaces of the three wedges, with the inclined facing surfaces of the wedges being recessed to provide seating for the resilient pads.

References Cited in the file of this patent

UNITED STATES PATENTS

| | | |
|---|---|---|
| 2,212,550 | Parks | Aug. 27, 1940 |
| 2,463,059 | Laurer | Mar. 1, 1949 |
| 2,759,759 | Blackwood | Aug. 21, 1956 |

FOREIGN PATENTS

| | | |
|---|---|---|
| 804,438 | Great Britain | Nov. 12, 1958 |